United States Patent
Pradhan et al.

(10) Patent No.: US 10,635,409 B2
(45) Date of Patent: Apr. 28, 2020

(54) SYSTEM AND METHOD FOR IMPROVING SOFTWARE CODE QUALITY USING ARTIFICIAL INTELLIGENCE TECHNIQUES

(71) Applicant: Cognizant Technology Solutions India Pvt. Ltd., Chennai (IN)

(72) Inventors: Saroj Pradhan, Kolkata (IN); Tapodhan Sen, Kolkata (IN); Anirban Chakrabarti, Kolkata (IN)

(73) Assignee: COGNIZANT TECHNOLOGY SOLUTIONS INDIA PVT. LTD., Chennai (IN)

( * ) Notice: Subject to any disclaimer, the term of this patent is extended or adjusted under 35 U.S.C. 154(b) by 32 days.

(21) Appl. No.: 15/952,565

(22) Filed: Apr. 13, 2018

(65) Prior Publication Data
US 2019/0220253 A1   Jul. 18, 2019

(30) Foreign Application Priority Data
Jan. 15, 2018   (IN) .............................. 201841001658

(51) Int. Cl.
*G06F 8/33* (2018.01)
*G06N 3/08* (2006.01)
*G06F 8/30* (2018.01)

(52) U.S. Cl.
CPC .................. *G06F 8/33* (2013.01); *G06F 8/30* (2013.01); *G06N 3/08* (2013.01)

(58) Field of Classification Search
CPC .................. G06F 8/71; G06F 8/10; G06F 8/30
USPC ........................................ 717/104, 106, 120
See application file for complete search history.

(56) References Cited

U.S. PATENT DOCUMENTS

| 5,860,011 | A | 1/1999 | Kolawa |
| 6,169,981 | B1 * | 1/2001 | Werbos .............. G05B 13/0265 706/23 |
| 8,336,030 | B1 | 12/2012 | Boissy |
| 9,208,056 | B1 | 12/2015 | Henriksen |
| 9,535,821 | B1 | 1/2017 | Delarue |

(Continued)

OTHER PUBLICATIONS

Hellendoorn et al., "Are Deep Neural Networks the Best Choice for Modeling Source Code?" (Year: 2017).*

(Continued)

*Primary Examiner* — Phillip H Nguyen
(74) *Attorney, Agent, or Firm* — Cantor Colburn LLP

(57) ABSTRACT

A system for improving software code quality using artificial intelligence is provided. The system comprises a training data extraction module to extract learning data files from a source control management system and an integrated development environment for preparing training data. The system further comprises a machine learning model trainer that conducts training of an artificial neural network. The system further comprises a machine learning recommendation module that queries the trained artificial neural network to check for recommendations for improving quality of one or more new software codes and one or more modified software codes. The system also comprises a remediation module that determines one or more coding standard violations in the one or more new software codes and one or more modified software codes. The quality of the one or more new software codes and one or more modified software codes is improved by applying the recommendations.

20 Claims, 3 Drawing Sheets

(56) References Cited

U.S. PATENT DOCUMENTS

Figure 1:
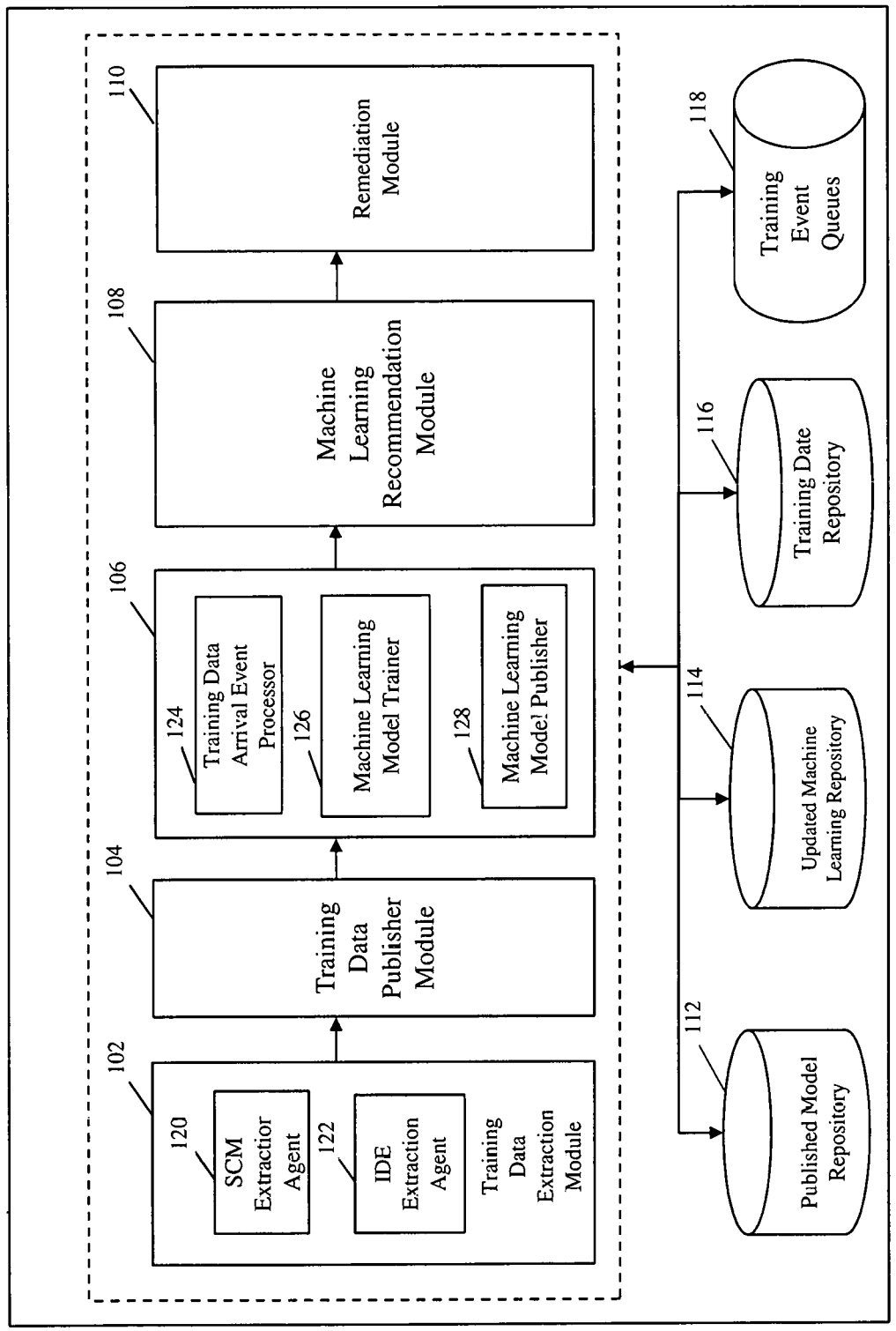

| | | | | |
|---|---|---|---|---|
| 10,068,557 | B1* | 9/2018 | Engel | G10H 1/0041 |
| 2005/0091642 | A1* | 4/2005 | Miller | G06F 11/3664 |
| | | | | 717/124 |
| 2009/0288064 | A1* | 11/2009 | Yen | G06N 5/02 |
| | | | | 717/106 |
| 2011/0055798 | A1 | 3/2011 | Kraft | |
| 2017/0212829 | A1* | 7/2017 | Bales | G06F 11/3664 |
| 2018/0176576 | A1* | 6/2018 | Rippel | H04N 19/126 |

OTHER PUBLICATIONS

Dahl et al., "Parallelizing Neural Network Training for Cluster Systems" (Year: 2008).*

Abbas Heiat, "Comparison of artificial neural network and regression models for estimating software development effort" (Year: 2002).*

Compliance, security automation, and remediation with Red Hat, 2016, https://www.redhat.com/en/about/videos/compliance-security-automation-and-remediation-red-hat.

Top 5 coding practices related with Java exception handling, 2014, https://dzone.com/articles/java-top-5-exception-handling.

* cited by examiner

SYSTEM AND METHOD FOR IMPROVING SOFTWARE CODE QUALITY USING ARTIFICIAL INTELLIGENCE TECHNIQUES

CROSS REFERENCE TO RELATED APPLICATION

This application is related to and claims the benefit of Indian Patent Application Number 201841001658 filed on Jan. 15, 2018, the contents of which are herein incorporated by reference in their entirety.

FIELD OF THE INVENTION

The present invention relates generally to computer program development. In particular, the present invention relates to a method and system for improving software code quality during its development using artificial intelligence techniques.

BACKGROUND OF THE INVENTION

Maintaining software code quality of modern business software applications has become challenging for an individual or even for a team. The primary reason for this complexity is that the current software applications are way too complex and consist of millions of lines of code written in diverse programming languages and backed by hundreds of business rules. This situation demands for automation in maintaining software code quality to ensure that implementation of the software application meets quality goals that are important to the organization.

Traditionally, automation in maintaining software code quality is achieved by incorporating various quality audit tools that are driven by one or more rules. However, as the software code base and programming languages evolve over time, the existing one or more rules become obsolete and irrelevant. Also, with modern software development practices, creating and updating these one or more rules has become nearly impossible. Further, a rule based model cannot learn from manual rectifications made in the software codes by experienced software developers.

Therefore, there is a need for a learning based adaptive solution that may predict software code remediation against any coding standard violation in any of the programming languages and may overcome limitations of the rule-based techniques of improvising quality of the software codes.

SUMMARY OF THE INVENTION

In an embodiment of the present invention, a system for improving software code quality using artificial intelligence is provided. The system comprises a training data extraction module configured to extract learning data files from one or more software codes present in at least one of: a Source Control Management (SCM) system and an Integrated Development Environment (IDE) for preparing training data. The one or more software codes present in the at least one of: SCM system and IDE may comprise software codes without any error and software codes with one or more errors from perspective of coding standards violation. The coding standards violation may comprise at least one of: exception generalization, class naming conventions, method naming conventions, variable naming conventions, nested logics, method signatures, and logging.

The system further comprises a training data publisher module which is configured to receive training data files from the training data extraction module. The training data publisher module is further configured to publish an event every time a training data file is received from the training data extraction module. Further, a training data arrival event processor is communicatively coupled to the training data publisher module. The training data arrival event processor is programmed to receive one or more events published by the training data publisher module. The training data arrival event processor is further programmed to process the received one or more events and check for availability of a training window of the machine learning model trainer and a software application whose code quality is to be improved.

The system further comprises a machine learning model trainer which is configured to encode the training data based on machine learning model and to conduct training of an artificial neural network. The machine learning model may be perceptron model of artificial neural network. Further, the training of the artificial neural network is implemented inside a deep learning framework. The deep learning framework queues the training data in a plurality of parallel training event queues to achieve scalability in training of the artificial neural network. The deep learning framework platform further employs a scheduler to pick up training data from the training event queues to train the artificial neural network. Furthermore, the artificial neural network is trained on one or more software codes without any errors and on the software codes with one or more errors with respect to coding standard violations. In an embodiment of the present invention, the artificial neural network is trained for handling exceptions in the at least one of: one or more new software codes and one or more modified software codes.

The system further comprises a machine learning recommendation module which is configured to query the trained artificial neural network to check for one or more recommendations for improving quality of at least one of: one or more new software codes and one or more modified software codes.

The system furthermore comprises a remediation module that is configured to determine one or more coding standard violations in the at least one of: one or more new software codes and one or more modified software codes. The remediation module automatically checks the at least one of: one or more new software codes and one or more modified software codes in the IDE to determine one or more coding standard violations. The remediation module is further configured to improve quality of the at least one of: one or more new software codes and one or more modified software codes by applying the one or more recommendations. The remediation module improves quality of the at least one of: one or more new software codes and one or more modified software codes by auto-correcting the at least one of: one or more new software codes and one or more modified software codes in the IDE based on the one or more recommendations.

In another embodiment of the present invention, a method for improving software code quality using artificial intelligence is provided. The method comprises identifying learning data files from one or more software codes present in at least one of: a Source Control Management (SCM) system and an Integrated Development Environment (IDE) for preparing training data. The method further comprises conducting training of an artificial neural network using the training data. The artificial neural network is trained on one or more software codes without any errors and on the software codes with one or more errors with respect to coding standard violations. The coding standards violation comprise at least one of: exception generalization, class naming conventions, method naming conventions, variable naming conventions, nested logics, method signatures, and logging. In an embodiment of the present invention, the artificial neural network is trained for handling exceptions in the at least one of: one or more new software codes and one or more modified software codes.

The method further comprises identifying one or more coding standard violations in at least one of: one or more new software codes and one or more modified software codes. The one or more coding standard violations are identified by automatically checking the at least one of: one or more new software codes and one or more modified software codes in the IDE. Thereafter, the artificial neural network is queried for one or more recommendations for improving software codes. Finally, the one or more recommendations are applied to improve the quality of the at least one of: one or more new software codes and one or more modified software codes. The quality of the at least one of: one or more new software codes and one or more modified software codes is improved by auto-correcting the at least one of: one or more new software codes and one or more modified software codes in the IDE.

In yet another embodiment of the present invention, a computer product comprising a non-transitory computer-readable medium having computer-readable program code stored thereon is provided. The computer-readable program code comprises instructions that when executed by a processor cause the processor to identify learning data files from one or more software codes present in at least one of: a Source Control Management (SCM) system and an Integrated Development Environment (IDE) for preparing training data. The processor further conducts training of an artificial neural network using the training data. Thereafter, the processor identifies one or more coding standard violations in at least one of: one or more new software codes and one or more modified software codes. Further, the processor queries the trained artificial neural network for one or more recommendations for improving software codes. The processor finally applies the one or more recommendations to improve the quality of the at least one of: one or more new software codes and one or more modified software codes.

BRIEF DESCRIPTION OF THE ACCOMPANYING DRAWINGS

Figure 2:
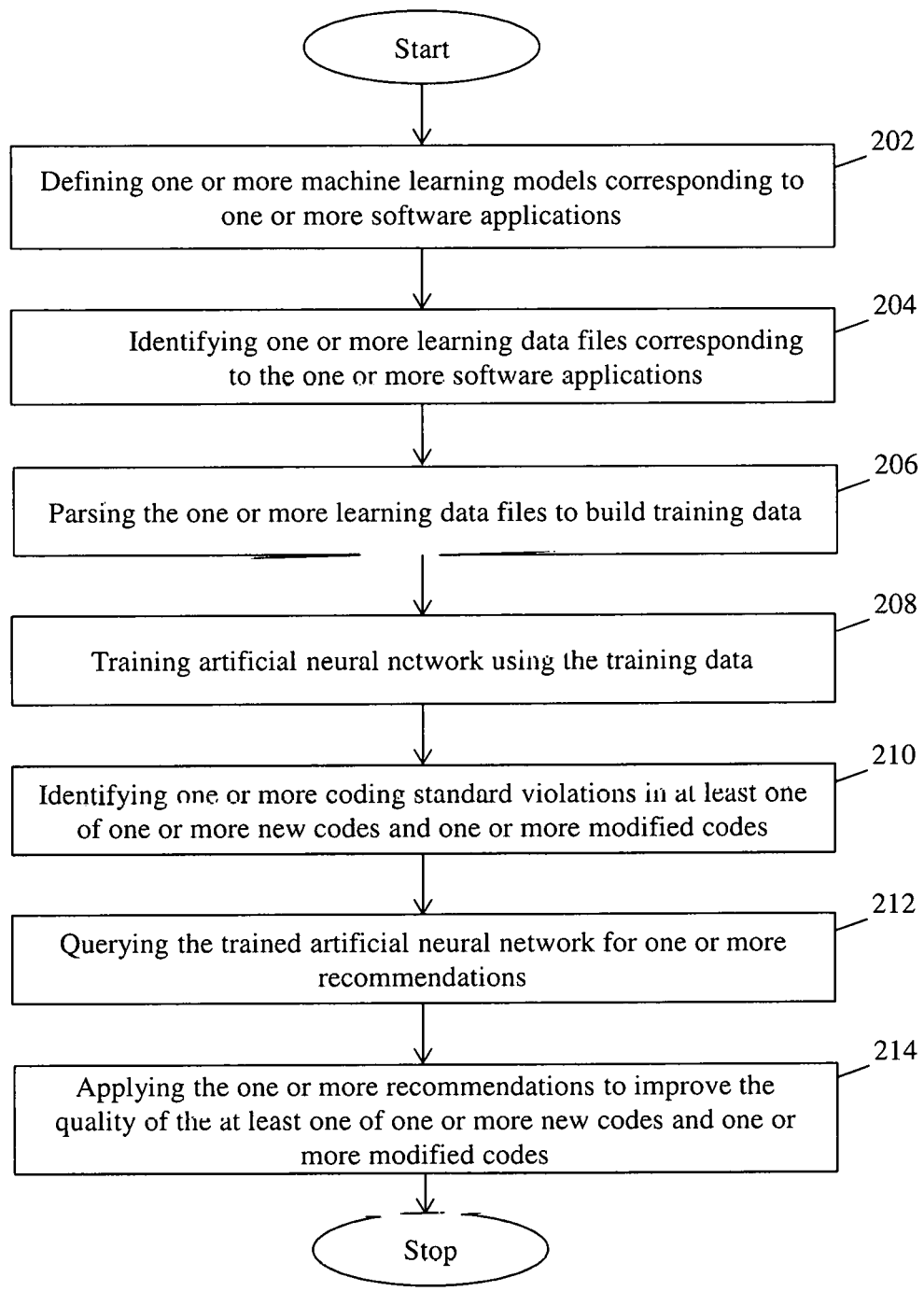
Figure 3:
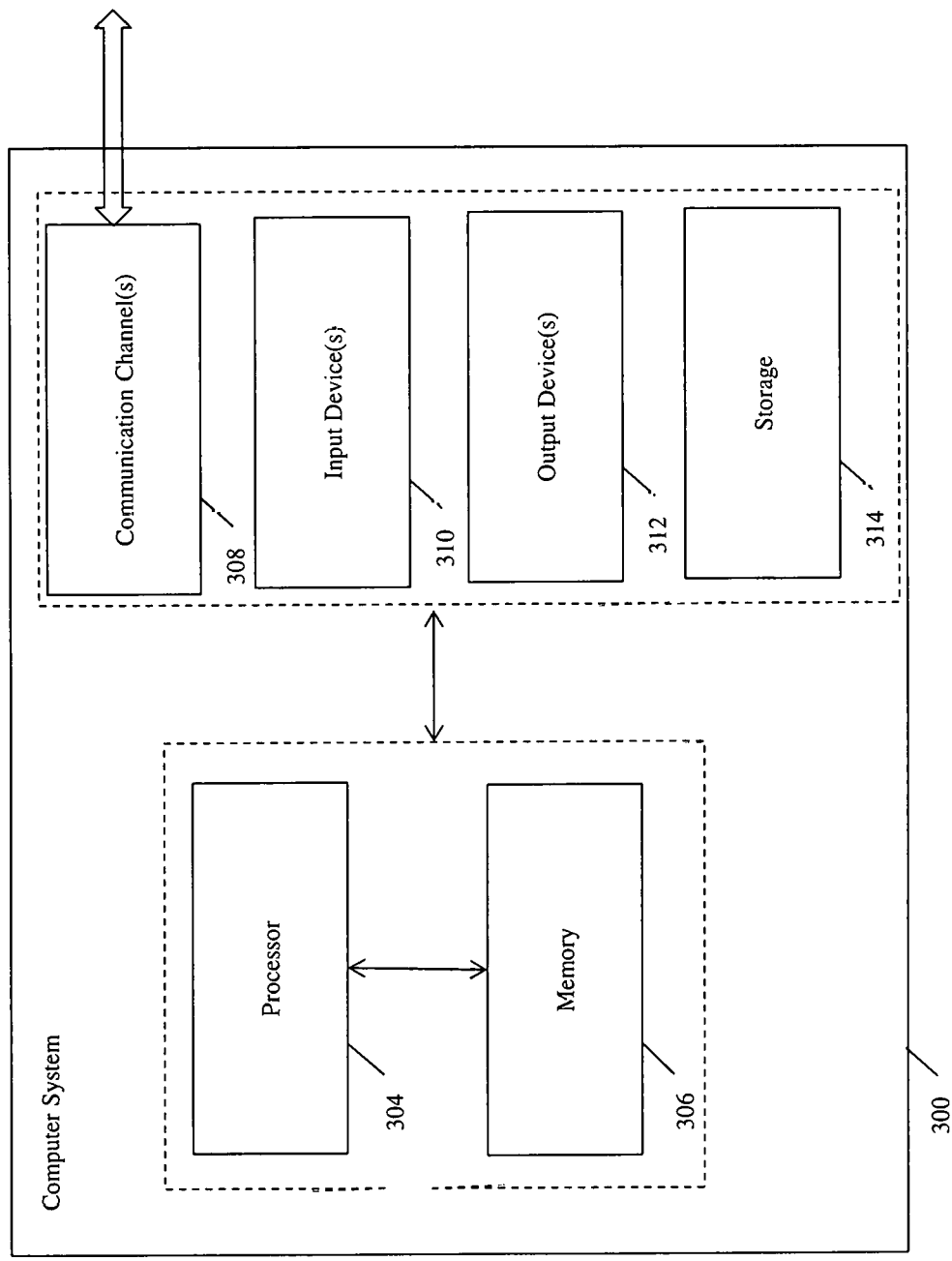

The present invention is described by way of embodiments illustrated in the accompanying drawings wherein:

FIG. 1 is a block diagram illustrating a system for improving software code quality using artificial intelligence techniques in accordance with an embodiment of the present invention; and FIG. 2 is a flowchart illustrating a method for improving software code quality using artificial intelligence techniques in accordance with an embodiment of the present invention; and FIG. 3 illustrates an exemplary computer system in which various embodiments of the present invention may be implemented.

DETAILED DESCRIPTION OF THE INVENTION

A system, a method and a computer program product is provided for improving software code quality using artificial intelligence. The system comprises a training data extraction module to extract learning data files from a source control management system and an integrated development environment for preparing training data. The system further comprises a machine learning model trainer that conducts training of an artificial neural network. The system further comprises a machine learning recommendation module that queries the trained artificial neural network to check for recommendations for improving quality of one or more new software codes and one or more modified software codes. The system also comprises a remediation module that determines one or more coding standard violations in the one or more new software codes and one or more modified software codes. The quality of the one or more new software codes and one or more modified software codes is improved by applying the recommendations.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

FIG. 1 is a block diagram illustrating a system 100 for improving software code quality using artificial intelligence techniques in accordance with an embodiment of the present invention. It may be apparent to a person of ordinary skilled in the art that the artificial intelligence or machine learning can be implemented using numerous techniques including, without any limitation, case-based reasoning, rule-based systems, fuzzy models, genetic algorithms, cellular automata, multi-agent systems, swarm intelligence, reinforcement learnings, artificial neural networks, and hybrid systems. In an embodiment of the present invention, the system 100 may employ artificial neural network to improve quality of the software code. The software code whose quality is to be improved by the system 100 may be, without any limitation, a mobile application and a web application. Further, to improve the software code quality, the system 100 may employ a training data extraction module 102, a data publisher module 104, a machine learning training module 106, an machine learning recommendation module 108, a remediation module 110, a published model repository 112, an updated machine learning repository 114, a training data repository 116, and training event queues 118.

The training data extraction module 102 is configured to extract learning data files from one or more software codes present in a Source Control Management (SCM) system and an Integrated Development Environment (IDE) for preparing training data. The SCM system keeps a track of all the changes made in the one or more software codes. The IDE is a software application that provides comprehensive facilities to computer programmers for software development. An IDE normally consists of a source code editor, build automation tools and a debugger. Thus, the software codes in the SCM system and the IDE may include correct software codes i.e. software codes without any errors and incorrect software codes i.e. the software codes with one or more errors from perspective of coding standards violation. The various coding standard violations may include, without any limitation, exception generalization, class naming conventions, method naming conventions, variable naming conventions, nested logics, method signatures, and logging. The training data extraction module 102 further comprises a SCM extraction agent 120 and an IDE extraction agent 122. The SCM extraction agent 120 is configured to extract one or more learning data files from the latest available software code base in SCM system. In an embodiment of the present invention, the SCM extraction agent 120 may utilize a plugin based on Representational State Transfer (REST) protocol to explore the software codes inside the SCM system and extract one or more learning data files for training of the artificial neural network. In an exemplary embodiment of the present invention, the extracted learning data files may be compiled in an MS Excel format. The SCM extraction agent 120 is further configured to send the one or more extracted learning data files to the data publisher module 104.

The IDE extraction agent 122 is configured to extract the learning data from the latest available software code base in the IDE. In an embodiment of the present invention, the IDE may be Eclipse. Eclipse is a Java-based development platform providing plugins that allow developers to develop and test software codes written in different programming languages. Further, a plugin based on REST protocol may be utilized to parse the software code inside the eclipse workspace, and sample out or extract the software code segments for training the artificial neural network. The plugin may further be configured to monitor and capture incorrect segments of software codes in the IDE and also record how the errors in these incorrect segments of software codes have been rectified. The IDE extraction agent 122 may then send the extracted software code segments or learning data files to the data publisher module 104. In an exemplary embodiment of the present invention, the extracted software code segments or data files may be sent in the form of an MS Excel format.

The training data publisher module 104 is configured to receive the learning data files sent by the SCM Agent 120 and the IDE extraction agent 122 and push the received learning data files to the training data repository 116. The training data repository 116 collates all the learning data files and parses them to prepare training data. The training data publisher module 104 is further configured to publish an event every time a training data file is received from the SCM extraction agent 120 and the IDE extraction agent 122. The triggering of the events is an asynchronous communication which facilitates avoiding false triggering of AI training operation that may get triggered by frequent software code updates of the software application.

The machine learning training module 106 further comprises a training data arrival event processor 124, a machine learning model trainer 126, and a machine learning model publisher 128. The training data arrival event processor 124 is a special purpose microprocessor which is programmed to monitor and receive the one or more events published or broadcasted by the data publisher module 104. The training data arrival event processor 124 is further programmed to process the received one or more events and check for availability of a training window of the machine learning model trainer 126 and a software application whose code quality is to be improved. Upon availability of the training window of the machine learning model trainer 126 and the software application, the training data arrival event processor 124 initiates the training process of the artificial neural network with the latest version of training data available in training data repository 116. The checking of the availability of the training window of the machine learning model trainer 126 and the software application facilitates in an efficient computer resource planning by engaging the computer resources, like system memory and processor, only when required.

The machine learning model trainer 126 is configured to encode the training data based on the machine learning model and to conduct training of the artificial neural network. In an embodiment of the present invention, the machine learning model may be perceptron model of artificial neural network. Further, the training of the artificial neural network may be implemented inside a deep learning framework. In an embodiment of the present invention, the deep learning framework may be Deep Learning for Java (DL4J) platform. DL4J is an open-source, distributed deep-learning library written for Java and Scala. The deep learning framework may import the artificial neural network from any of the frameworks for the predefined training. The artificial neural network may be trained on one or more software codes without any errors and further on the software codes with one or more errors with respect to coding standard violations. The capabilities of the deep learning framework based artificial neural network may be exposed by an Application Programming Interface (API). The API may also facilitate training of the artificial neural network using the training data received from training data repository 116. In an embodiment of the present invention, the deep learning framework may facilitate queuing of the training data in a plurality of parallel training event queues 118 to achieve scalability in training. Further, the deep learning framework may employ a scheduler to pick up training data from the training event queues 118 to train the artificial neural network. As more and more segments of the software codes or training data is fed into the machine learning model trainer 126, the deep learning framework generalizes the pattern hidden in the fed software codes to allow the artificial neural network to adjust its neuron weights and biases. The adjustment in neuron weights and biases facilitates minimization in software code remediation prediction errors. In an embodiment of the present invention, the deep learning framework platform may enable a Graphical User Interface (GUI) for analysing the training data and the trained artificial neural network. The GUI further facilitates generation of one or more reports on the training data and the trained artificial neural network. Finally, after the training of the artificial neural network is completed, the trained artificial neural network is stored in the updated machine learning repository 114 for subsequent publication to the published model repository 112.

In an embodiment of the present invention, the artificial neural network may be trained for handling exceptions in the software codes. It may be apparent to a person of ordinary skill in the art that the exceptions may be handled by the Try-Catch-Throw approach. Thus, the artificial neural network may be trained to learn the Try-Catch-Throw approach for improvising software codes when an exception is encountered in the software code of the software application. The artificial neural network may learn one or more patterns of the Try-Catch-Throw approach from the training data to handle the exceptions.

Further, the machine learning model publisher 128 is configured to select the latest version of the trained artificial neural network from the updated machine learning repository 114 and publish them to the published model repository 112.

The machine learning recommendation module 108 is configured to get invoked by the remediation module 110 and to issue a query to the artificial neural network to check for one or more recommendations for improving software codes. The machine learning recommendation module 108 is further configured to provide the remediation module 110 with the one or more recommendations for software code quality improvements.

The remediation module 110 is configured to facilitate one or more developers to perform checks on one or more new software codes that they create or modify in the IDE. In an embodiment of the present invention, checking of the one or more new software codes or modified software codes for exceptions may be an on-demand facility extended to the developers by the remediation module 110. In another embodiment of the present invention, the remediation module 110 may automatically check software code segments in the IDE for exceptions. In an embodiment of the present invention, during the checking of the at least one of the one or more new software codes and the one or more modified software codes, the remediation module 110 may determine that the new software codes developed or modified by the developer involves usage of exceptions. Upon such a determination, the remediation module 110 may invoke the machine learning recommendation module 108 with the software code's details. The machine learning recommendation module 108 may query the API of the deep learning framework for one or more recommendations for handling the identified exceptions. The deep learning framework may predict multiple recommendations for handling the exceptions with multiple values of probabilities and with a level of confidence. The one or more recommendations may be received by the machine learning recommendation module 108. Further, the one or more recommendations may be for remediation or improvement of the software code with regard to the exceptions in the software codes. In an embodiment of the present invention, the one or more recommendations may be to catch the identified exception. In another embodiment of the present invention, the one or more recommendations may be to throw the identified exception. In yet another embodiment of the present invention, the one or more recommendations may be to re-throw the identified exception. Further, the remediation module 110 may improve quality of the one or more new and/or modified software codes by auto-correcting the one or more new and/or modified software codes in the IDE based on the developer's choice and one or more recommendations. In an embodiment of the present invention, the remediation module 110 may improve the quality of the new or modified software code by facilitating the developer to handle the exceptions in the software codes by applying the one or more recommended remediation.

FIG. 2 is a flowchart illustrating a method for improving software code quality using artificial intelligence techniques in accordance with an embodiment of the present invention. In an embodiment of the present invention, the method may employ an artificial neural network to improve quality of the software code. The software code whose quality is to be improved may be, without any limitation, a mobile application and a web application. At step 202, one or more machine learning models are defined corresponding to one or more software applications. The machine learning models may be defined on various software code quality aspects. One or more software code quality aspects may be mapped by one machine learning model. In an exemplary embodiment of the present invention, a first machine learning model may be defined for covering exception handling, a second machine learning model may be defined for covering class signatures, and a third machine learning model may be defined for method signature.

At step 204, software code segments or learning data files corresponding to the one or more software applications are identified from at least one of Source Control Management (SCM) system and an Integrated Development Environment (IDE) for preparing training data. After the learning data files are identified, the learning data files are extracted from the at least one of SCM and IDE. In an embodiment of the present invention, an SCM extraction agent is configured to extract one or more learning data files from the identified software code in SCM system. The SCM extraction agent may utilize a plugin based REST protocol to explore the software code inside the SCM system and extract one or more learning data files for training the artificial neural network. In an exemplary embodiment of the present invention, the extracted learning data files may be compiled in an MS Excel format.

In another embodiment of the present invention, an IDE extraction agent is configured to extract the learning data files from the identified software code in the IDE. In an exemplary embodiment of the present invention, the IDE may be Eclipse. Further, a plugin based on REST protocol may be utilized to parse the software code inside the eclipse workspace, and sample out or extract the software code for training the artificial neural network. The plugin may further be configured to monitor and capture incorrect segments of software codes in the IDE and also record how the errors in these incorrect segments of software codes have been rectified. In an exemplary embodiment of the present invention, the extracted software code segments or data files may be sent in the form of MS Excel format for training the artificial neural network.

At step 206, the extracted one or more data files from the at least one of SCM and IDE are parsed to build training data. In an embodiment of the present invention, the training data may be parsed by building an Abstract Syntax Tree (AST). The training data is then extracted by traversing the AST and fetching appropriate keywords.

At step 208, the training of the artificial neural network is conducted using the training data. In an embodiment of the present invention, the training of the artificial neural network may be implemented inside a deep learning framework. In an exemplary embodiment of the present invention, the deep learning framework may be Deep Learning for Java (DL4J) framework. The artificial neural network may be trained based on the training data which includes one or more software codes without any errors and the software codes with one or more errors with regard to coding standard violations. The various coding standard violations may include, without any limitation, exception generalization, class naming conventions, method naming conventions, variable naming conventions, nested logics, method signatures, and logging. Further, as more and more segments of the software codes or training data is fed for training, the deep learning framework generalizes the pattern hidden in the fed software codes to allow the artificial neural network to adjust its neuron weights and biases. The adjustment in neuron weights and biases facilitates minimization in software code remediation prediction errors.

In an embodiment of the present invention, the artificial neural network may be trained for handling exceptions in the software codes. It may be apparent to a person of ordinary skill in the art that the exceptions may be handled by the Try-Catch-Throw approach. Thus, the artificial neural network may be trained to learn the Try-Catch-Throw approach for improvising software codes when an exception is encountered in the software code of the software application. The artificial neural network may learn one or more patterns of the Try-Catch-Throw approach from the training data to handle the exceptions.

At step 210, one or more coding standard violations are identified in at least one of one or more new software codes and the one or more modified software codes corresponding to the one or more software applications in the IDE. In an embodiment of the present invention, the one or more coding standard violations may include usage of exceptions in the at least one of one or more new software codes or one or more altered or modified existing codes.

At step 212, the trained artificial neural network implemented in deep learning framework is queried for one or more recommendations. In an exemplary embodiment of the present invention, the trained artificial neural network is queried for handling the identified usage of exceptions. The deep learning framework may predict multiple recommendations for handling the exceptions with multiple values of probabilities and with a level of confidence. The recommendations may be for remediation or improvement of at least one of the one or more new codes or the one or more altered or modified existing codes with regard to the exceptions in the software codes. In an embodiment of the present invention, the recommendation may be to catch the identified exception. In another embodiment of the present invention, the recommendation may be to throw the identified exception. In yet another embodiment of the present invention, the recommendation may be to re-throw the identified exception.

At step 214, the one or recommendations are applied to improve the quality of the at least one of the one or more new codes and the one or more modified codes. In an embodiment of the present invention, the one or more new codes or the modified codes may be auto-corrected based on the developer's choice and the received recommendations. In another embodiment of the present invention, the developer may review the one or more recommendations and may apply the recommendations to improve the quality of the one or more new codes or the one or more altered or modified existing codes.

FIG. 3 illustrates an exemplary computer system in which various embodiments of the present invention may be implemented.

The computer system 302 comprises a processor 304 and a memory 306. The processor 304 executes program instructions and may be a physical processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various software executing in the computer system 302, and manages different functionalities of the components of the computer system 302. In an exemplary embodiment of the present invention, the computer system 302 may be a Linux (Ubuntu) based computer system with 8 cores processor, 20 Gigabytes (GB) of Random Access Memory (RAM) and 1 Terabytes of storage. Further in an exemplary embodiment of the present invention, the machine learning model trainer 126 may be designed to have a 2×NVIDIA Tesla K40 Graphics Processing Unit (GPU) Accelerator, a 2×Intel Xeon Central Processing Unit (CPU) which may have 8 cores or higher, and 64 GB RAM.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as a system, a method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A system for improving software code quality using artificial intelligence, the system comprising:
   a memory storing program instructions;
   a processor configured to execute program instructions stored in the memory;
   a training data extraction module executed by the processor and configured to extract learning data files from one or more software codes present in at least one of: a Source Control Management (SCM) system and an Integrated Development Environment (IDE) for preparing training data;
   a machine learning model trainer executed by the processor and configured to encode the training data based on machine learning model and to conduct training of an artificial neural network; wherein the training of the artificial neural network is initiated based on reception of an event that is triggered asynchronously every time the learning data files are received; and
   a machine learning recommendation module executed by the processor and configured to query the trained artificial neural network to check for one or more recommendations for improving quality of at least one of: one or more new software codes and one or more modified software codes.

2. The system of claim 1, wherein the one or more software codes present in the at least one of: SCM system and IDE comprise software codes without any error and software codes with one or more errors from perspective of coding standards violation.

3. The system of claim 2, wherein the coding standards violation comprise at least one of: exception generalization, class naming conventions, method naming conventions, variable naming conventions, nested logics, method signatures, and logging.

4. The system of claim 1, further comprising a training data publisher module executed by the processor and configured to receive training data files from the training data extraction module, wherein the training data publisher module is further configured to publish an event every time a training data file is received from the training data extraction module.

5. The system of claim 4, wherein the training data publisher module is communicatively coupled to a training data arrival event processor, the training data arrival event processor is programmed to receive the events published by the training data publisher module, the training data arrival event processor is further programmed to process the received one or more events and check for availability of training window of the machine learning model trainer and a software application whose code quality is to be improved.

6. The system of claim 1, wherein the machine learning model is a perceptron model of artificial neural network.

7. The system of claim 1, wherein the training of the artificial neural network is implemented inside a deep learning framework.

8. The system of claim 7, wherein the deep learning framework queues the training data in a plurality of parallel training event queues to achieve scalability in training of the artificial neural network.

9. The system of claim 8, wherein the deep learning framework platform employs a scheduler to pick up training data from the training event queues to train the artificial neural network.

10. The system of claim 1, wherein the artificial neural network is trained on one or more software codes without any errors and on the software codes with one or more errors with respect to coding standard violations.

11. The system of claim 1, wherein the artificial neural network is trained for handling exceptions in the at least one of: one or more new software codes and one or more modified software codes.

12. The system of claim 1, wherein the remediation module executed by the processor automatically checks the at least one of: one or more new software codes and one or more modified software codes in the IDE to determine one or more coding standard violations; and
   improve quality of the at least one of: one or more new software codes and one or more modified software codes based on the one or more recommendations.

13. The system of claim 1, wherein the remediation module improves quality of the at least one of: one or more new software codes and one or more modified software codes by auto-correcting the at least one of: one or more new software codes and one or more modified software codes in the IDE based on the one or more recommendations.

14. A method for improving software code quality using artificial intelligence, the method comprising:
   identifying learning data files from one or more software codes present in at least one of: a Source Control Management (SCM) system and an Integrated Development Environment (IDE) for preparing training data;
   training an artificial neural network using the training data, wherein the training of the artificial neural network is initiated based on reception of an event that is triggered asynchronously every time the learning data files are received;
   identifying one or more coding standard violations in at least one of: one or more new software codes and one or more modified software codes;
   querying the trained artificial neural network for one or more recommendations for improving software codes; and
   applying the one or more recommendations to improve the quality of the at least one of: one or more new software codes and one or more modified software codes.

15. The method of claim 1, wherein the artificial neural network is trained on one or more software codes without any errors and on the software codes with one or more errors with respect to coding standard violations.

16. The method of claim 2, wherein the coding standards violation comprise at least one of: exception generalization, class naming conventions, method naming conventions, variable naming conventions, nested logics, method signatures, and logging.

17. The method of claim 14, wherein the artificial neural network is trained for handling exceptions in the at least one of: one or more new software codes and one or more modified software codes.

18. The method of claim 14, wherein the at least one of: one or more new software codes and one or more modified software codes are automatically checked in the IDE to identify one or more coding standard violations.

19. The method of claim 14, wherein the quality of the at least one of: one or more new software codes and one or more modified software codes is improved by auto-correcting the at least one of: one or more new software codes and one or more modified software codes in the IDE based on the one or more recommendations.

20. A computer program product comprising:
a non-transitory computer-readable medium having computer-readable program code stored thereon, the computer-readable program code comprising instructions that when executed by a processor, cause the processor to:
identify learning data files from one or more software codes present in at least one of: a Source Control Management (SCM) system and an Integrated Development Environment (IDE) for preparing training data;
conduct training of an artificial neural network using the training data, wherein the training of the artificial neural network is initiated based on reception of an event that is triggered asynchronously every time the learning data files are received;
identify one or more coding standard violations in at least one of: one or more new software codes and one or more modified software codes;
query the trained artificial neural network for one or more recommendations for improving software codes; and
apply the one or more recommendations to improve the quality of the at least one of: one or more new software codes and one or more modified software codes.

* * * * *